Oct. 31, 1950     A. C. PETERSON     2,527,845
HEAT TRANSFER MEANS FOR HEATING AND COOLING
Filed Feb. 8, 1947     4 Sheets-Sheet 1
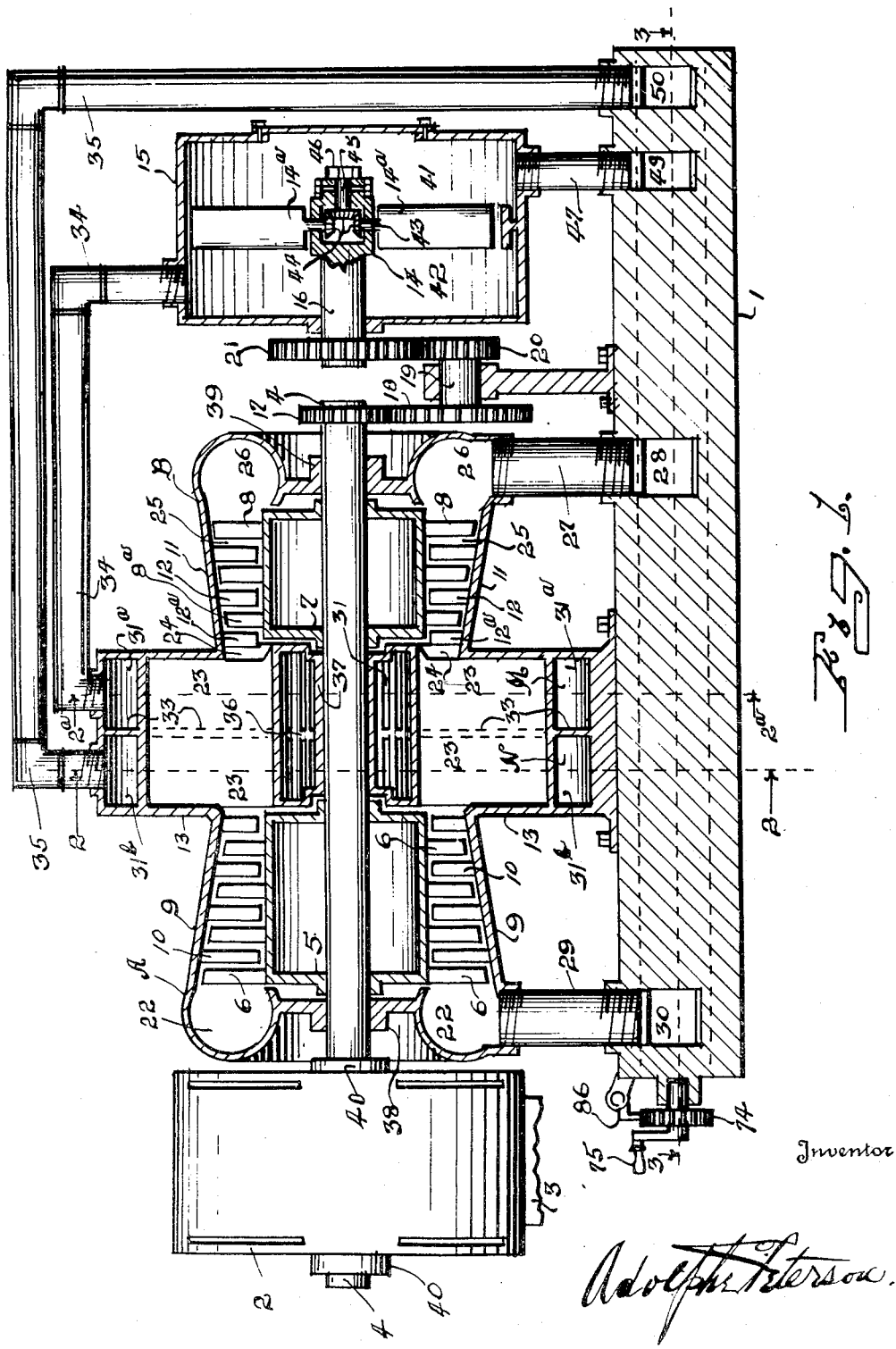
Inventor
Adolph C. Peterson.

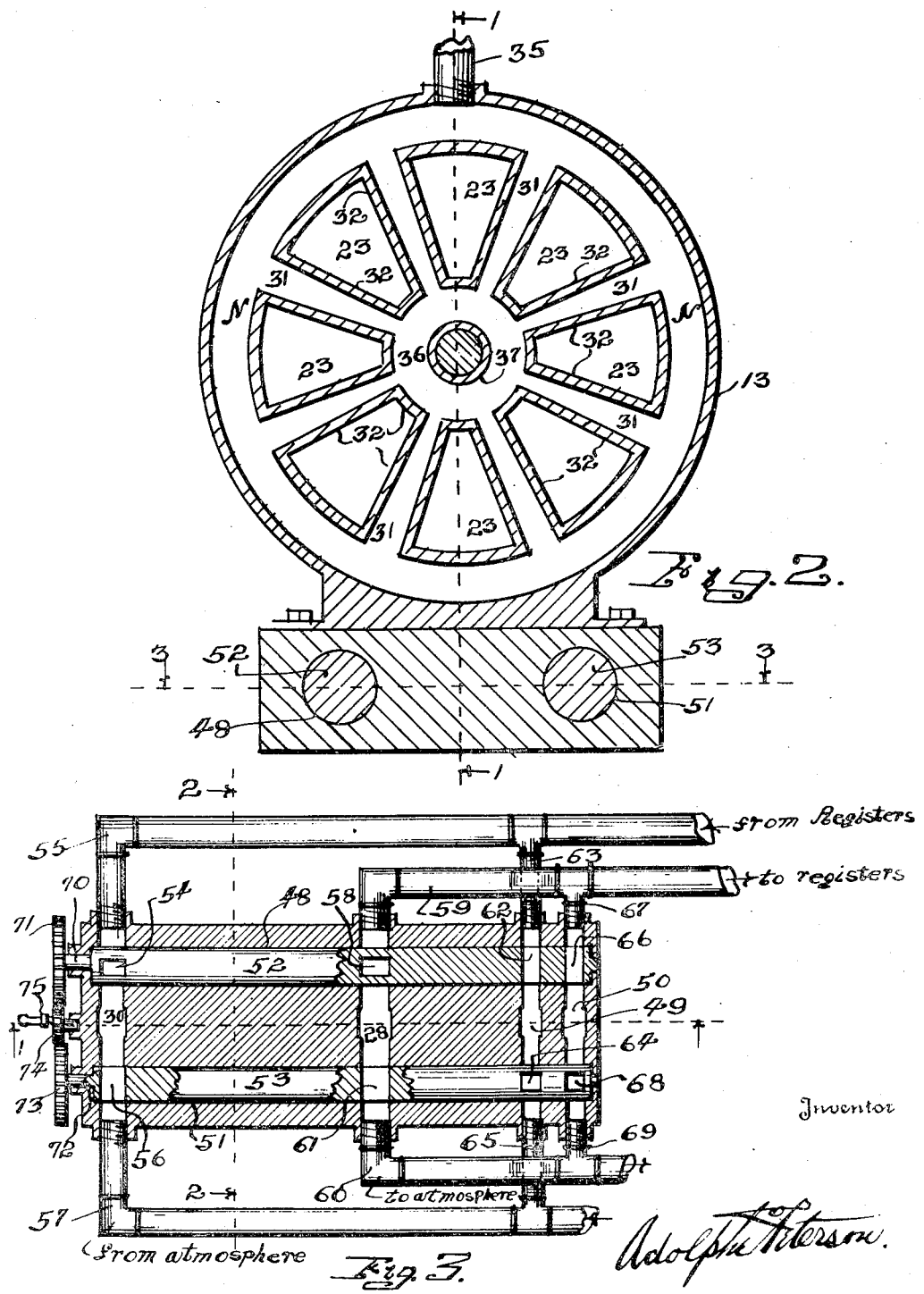

Oct. 31, 1950     A. C. PETERSON     2,527,845
HEAT TRANSFER MEANS FOR HEATING AND COOLING
Filed Feb. 8, 1947     4 Sheets-Sheet 3
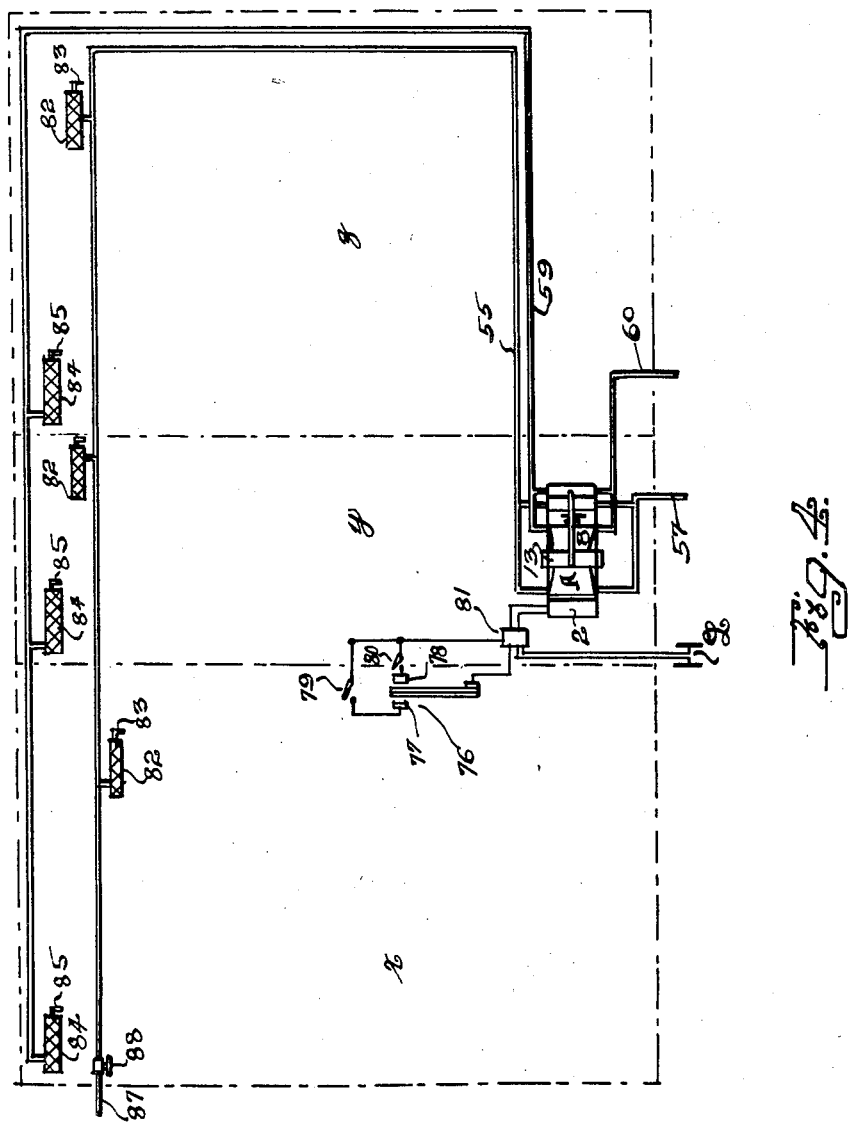
Inventor
Adolph C. Peterson.

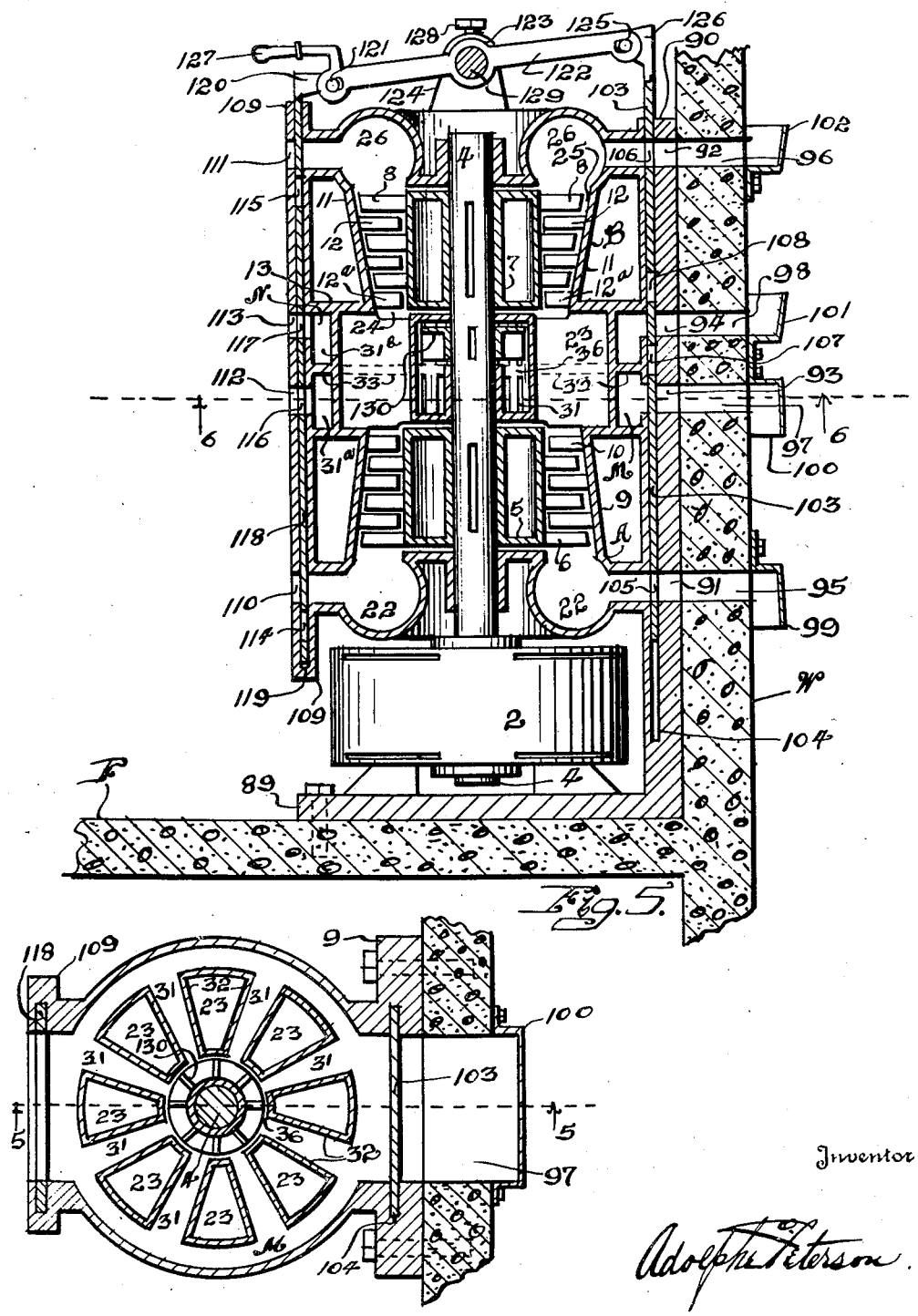

Patented Oct. 31, 1950

2,527,845

UNITED STATES PATENT OFFICE 2,527,845

HEAT TRANSFER MEANS FOR HEATING AND COOLING

Adolphe C. Peterson, Minneapolis, Minn.

Application February 8, 1947, Serial No. 727,374

14 Claims. (Cl. 62—136)

1

My invention relates to heating and cooling means with particular relation to heat abstraction means and is called heat transfer means for heating and cooling.

The particular objects of my invention are to provide a means which shall be simple, and reliable in use, and efficient in use, to provide for the heating and cooling of houses, particularly, other buildings, and enclosed spaces. A chief object is to provide a means for the abstraction of heat from a source which is almost universally available on the earth, which source is very abundant, and to provide a means in conjunction therewith for the use of such abstracted heat for the heating of houses, particularly, and other types of buildings. An object is to provide this source of heat for such uses, particularly, by a means for the abstraction of such heat which does not involve too great an expenditure of power or too great complication and cost in the apparatus involved in the system. An object is to provide such an apparatus, accordingly, for heat abstraction and heat utilization, which will be available for common use at a maintenance and operation cost which is low and which is permissible to the ordinary or common user of heating appliances. An object is to provide in conjunction therewith a means of utilizing the same system for the abstraction of heat from air in a building or provided for a building for the cooling of this air or ventilating air provided for the building. In general an object is to provide such a system having the two capacities, mentioned above, that is for heating and cooling in a form which can utilize for its operation, any form of power, but particularly electricity, which may in many communities, be provided at low cost for the power for operation of the means, and may thus be utilized by electric power companies in conjunction with its customers for heat provision, and cooling provision.

In general the devices and combinations of devices comprising my invention, are as hereinafter described in the specifications and as defined in the claims. In the accompanying drawings which illustrate my invention, like characters refer to like parts throughout the several views, and forms, in so far as practicable. Referring to the drawings:

Figures 1, 2 and 3 illustrate one form of my invention and Figure 4 illustrates the application thereof in a house, diagrammatically.

Figure 1 is a view chiefly in vertical cross section through the principal elements of my device, the section being on a plane passing through the

2 axis of the principal operating devices, some parts being shown in full side elevation and some parts being broken away. This section is on the lines 1—1 of Figures 2 and 3.

Figure 2 is a section vertically at right angles to that of Figure 1, transversely of the apparatus, and on the lines 2—2 of Figures 1 and 3, some detail parts being shown in side elevation.

Figure 3 is a section horizontally on the lines 3—3 of Figures 1 and 2, this section being on a plane passing horizontally through the valve means in the base of the operating apparatus, and showing the connecting pipes or conduits in plan view, and showing the control elements and parts of the valves in plan view, in their locations in the base.

Figure 4 is a diagrammatic view illustrating diagrammatically a house floor plan wherein my apparatus is shown in very much reduced scale as connected with the conduits and registers and thermostatically controlled control device.

Figures 5 and 6 illustrate a modified form of my apparatus and a modified application thereof in a house heating system.

Figure 5 illustrates a section vertically through the axes of the principal operating elements of this form, some parts being shown in full side elevation, some broken away, this section being on the line 5—5 of Figure 6.

Figure 6 is a section on a horizontal plane through line 6—6, Fig. 5, of this modified form and through the valve control devices, some parts being shown in full plan view. This view is taken on a plane transversely of that of Figure 5.

Referring first to the Figs. 1 to 4, both inclusive, the device comprises, generally, a base 1, an electric motor or other power generating plant 2, having base supporting members 3 (broken away), a rotor shaft 4 which is also the motor shaft or connected therewith, an axial flow air compressor rotor 5 fixed on the shaft 4 to rotate therewith and having air compressing or moving blades 6, an energy absorbing turbine rotor 7 having turbine blades 8 the rotor being fixed on shaft 4, the air compressor casing 9 having stator blades 10, the turbine casing 11 having turbine stator blades 12, a heat transfer means 13 between the compressor casing 9 and the turbine casing 11 and more especially described hereinafter, an air fan means 14 rotatable in a fan casing 15, a fan shaft 16 for the fan means 14, and speed reducing gear drive means consisting of gears 17 on shaft 4 at its end, the meshed gear 18, secondary gear shaft 19, gear 20 on shaft 19, and the meshed gear 21 fixed on fan shaft 16.

The air compressor casing 9 with its interior rotor 5 comprises what is generally known as an axial flow air compressor. The adoption of this axial flow form of air compressor does not exclude the use with my device of the usual centrifugal type of air compressor as either type of compressor may be used in any construction of my device. The axial flow compressor which is generally designated by the letter A, has at its leftward end in Figure 1, an annular air receiving chamber which is open to the annular passage between the compressor casing 9 and the rotor 5 wherein are the rotor blades 6 and the stator blades 10, so that air may flow from the receiving chamber, denoted 22, into that annular passage described and be there compressed and delivered as compressed air at the rightward end of this annular passage, Fig. 1, and there passed, as compressed and heated air, in the leftward end, Fig. 1, of the heat transfer means 13, passing in many individual streams into the leftward end, Fig. 1, of the compressed air flues or conduits 23. These compressed air flues 23 are each open at their rightward end, Fig. 1, to the annular space 24, Fig. 1, which is the opening to the leftward end or high pressure end of the annular turbine passage, denoted 25. The latter annular passage formed between the turbine casing 11 and the turbine rotor 7, contains the turbine blades 8 and the turbine stator blades 12, and this means forms the turbine expanding passage wherein the compressed air, as received at the leftward end thereof, from compressed air flues 23, expands at increasing velocity as it passes toward the exhaust annular chamber 26 formed in the turbine casing 11. The compressed air flues 23 and the annular space 24 form also a guide means wherein the compressed air is passed toward the first stage of turbine stator guide blades 12a, so that the compressed air is delivered upon the first stage of turbine rotor blades 8a at a proper direction to produce working driving thrust upon the tubine blades to induce rotation of the turbine rotor 7. The form of all the other turbine stator blades and turbine rotor blades is also such as to produce working driving thrust upon the turbine rotor 7 to drive it in its predetermined direction of rotation in operation.

It is to be specifically understood that the expansion of the compressed air, as the working fluid in the turbine annular passage 25, is accomplished in the turbine annular passage 25 in passage of the air against and by the turbine stator and rotor blades, and that this expansion does not occur in the compressed air flues 23 of the heat transfer means 13, except to such a very minor extent as may be necessary to permit the operational flow of the air. This is a factor in the operation of the means for the purpose hereinafter described, in order that the heat may be abstracted from the compressed air in the compressed air flues 23, before that compressed air reaches the turbine annular passage 25, wherein the expansion does occur to produce working effort upon the turbine rotor 7 and thereby upon the shaft 4. The exhaust annular chamber 26 delivers into an exhaust conduit 27 which delivers into a transverse conduit 28 formed in the base 1 and from which there is discharge by either method as hereinafter described in connection with the description of the control valve means in base 1. The receiving chamber 22 receives air at substantially atmospheric pressure from the conduit 29 and the latter receives the air from a transverse conduit 30 in the base 1, as the latter is controlled by the valve means hereinafter described, in base 1, to determine the source of this atmospheric pressure air.

The heat transfer means 13 is formed to have radially directed passages, which are so-called heat receiving passages denoted 31, Fig. 2, and these passages are separated completely from the compressed air flues 23 by the metal of the structure of the heat transfer means 13, so that the compressed air flowing through compressed air flues 23, so flows without any commingling with air or fluid in the heat receiving passages 31, but so that there may be as efficient transfer of heat from the compressd air in compressed air flues 23 through the metal to the air or fluid in the heat receiving passages 31, as is possible. To achieve as efficient and complete heat transfer as possible, this heat transfer means with the intermediate walls 32 may be made of copper or aluminum or an alloy thereof or of any other material which is sufficiently strong and efficient as a heat conductor.

The heat receiving passages 31 are divided longitudinally by metal or other walls 33 which separate the space of all the heat receiving passages 31 into virtually two parts or spaces, namely one part 31a and another part 31b, Fig. 1. The metal 33 passes through each heat receiving passage 31 between the adjacent walls 32, approximately mid-way of the length of the heat receiving passage, longitudinally (axially) of the casings 9, 13, 11, so that such separation is procured as to divide the air or fluid stream passing through heat receiving passages 31 into one general stream in part 31a and another general stream in part 31b. The stream in part 31a is connected to conduit 34 and the stream in part 31b is connected to conduit 35, and the two streams are connected by the inner annular chamber 36 so that there may be flow of air or fluid between the streams of the part 31a (in heat receiving passages 31) to the streams of the part 31b (in heat receiving passages 31) by way of this inner annular chamber 36, which is a chamber formed about the bearing member 37.

There are bearing members 38 and 39 formed in the casings to support the shaft 4 in rotation, and this shaft is also supported in bearing members 40 of the motor 2. The turbine is generally designated by the letter B. The gears 17, 18, 20, 21, form a reduction gearing whereby the speed of the rotor shaft 4 is reduced very much, so that the speed of shaft 16 is only say, one-fifth to one-tenth of that of shaft 4, depending on the construction proportions. The casing 15 is cylindrical in shape, so that it forms a conduit for passage of air or fluid from the space 41 on one side of the fan to the space 42 on the other side of the fan. The fan unit 14 has fan blades 14a, as many as form an efficient fan means, and each blade 14a is supported to have some oscillation on its shaft 43 so that by the gears 44, the blades may be slightly changed in their angle of incidence by means of the rotatable member 45 connected to one of the gears 44, so that a wrench or other tool may be applied to the hexagonal member 46 for adjustment of the blade angles, as may be found advisable for summer or winter operation, as hereinafter set out. The space 41 is connected to conduit 47 and the space 42 is connected to the conduit 34, so that there may be the connection and flow to or from the conduits (in either direction as hereinafter specified) which are denoted 49, 50, respectively, and are each transversely disposed in the base 1, the conduit 49 having connection with conduit 47 and the conduit 50 having connection with conduit 35. The conduits described thereby provide for a flow of air or fluid, as forced by fan unit 14 through the heat receiving passages 31, the stream passing first through the one side or part and then through the other part of the plurality of passages 31.

The valve control means, which is a means for differently directing the operating air or fluid streams through the apparatus, which has been described, is now described in detail. This valve control means is located in the base 1 and extends generally longitudinally thereof. The base 1 is generally as long horizontally as the devices constituting the compressor and turbine and fan means, and sufficiently broad to accommodate the valve means which consists chiefly of two long and rather large cylindrical valve bores 48 and 51, respectively, wherein there are rotatably mounted two cylindrical valves, 52 and 53, respectively, each of which is nearly as long as the base 1, and therefore extends nearly the full length of the operational devices, described above. The valve bores 48 and 51 are placed, so that one is intermediately of one side or end of the transverse conduits 30, 28, 49, 50, and therefore forms a part of each of those transverse conduits, and so that the other is intermediately of the other side or ends of the same conduits 30, 28, 49, 50, and thus forms part of each of those conduits. The valve 52 fills the one valve bore 48 and thus interrupts (except for its ports) the transverse conduits 30, 28, 49, 50, at one end of each (remote from its connection with the vertical conduits before described); and the other valve 53 fills the other valve bore 51 and thus interrupts (except for its ports) the transverse conduits 30, 28, 49, 50, at their other ends (remote from its connection with the vertical conduits before described), and thus either valve may by its ports or material open communication through the transverse conduit with the associated conduits 29, 27, 47, 35, which rise vertically from the respective transverse conduits (as before set out) or shut off that communication, according to the locationing of the valve by the control therefor. The transverse conduit 30 may by means of a port 54 have communication with a register conduit 55. The transverse conduit 30 may by means of a port 56 have communication with an atmospheric conduit 57 in an alternative position of the valves. The transverse conduit 28 may by means of a port 58 have communication with another register conduit 59 or may in an alternative position of the valves have communication with another atmospheric conduit 60 by means of the port 61 in the other valve. The transverse conduit 49 may by means of a port 62 in one of the valves have communication with a branch conduit 63 delivering into or connecting with the register conduit 55, or may have communication, in an alternative position of the valves, through a port 64 with a branch conduit 65 connecting with the atmospheric conduit 57. The transverse conduit 50 may by means of a port 66 in one of the valves have communication with a branch conduit 67 connecting with the other register conduit 59, or may have communication, in an alternative position of the valves, through a port 68 in the other valve, with a branch conduit 69 connecting with the other atmosphere conduit 60.

The ports described in valves 52 and 53 are so located, transversely of the valves as to provide the communication as to each at the proper position of the valves and in alternative conditions or positions, as hereinafter described. The valve 52 by its shaft 70 is fixed with spur gear 71 and the valve 53 is by its shaft 72 fixed with spur gear 73. The two spur gears 71 and 73 have between them a smaller spur gear 74 which provides coordination between the valves 52, 53, so that spur gear 74 by means of its affixed crank handle 75 may be rotated to rotate the valves 52 and 53 at a somewhat slower rate, and so that these valves may thus be manually positioned coordinately and in predetermined coordination in either of the two alternative positions to provide the alternative sets of communications, as hereinafter described, and through the means which has been described.

Fig. 4 diagrammatically shows the device in a house, showing a floor plan having rooms or spaces $x$, $y$, and $z$, and shows a thermostatic control means 76 having contacts 77 and 78 for either winter or summer operation and electric control hand switches 79 and 80 interposed in the circuits from the thermostatic control means to a relay means 81 which may according to the control of the thermostatic means send current from main lines L to the motor 2 for its operation. The register conduit 55 delivers from registers 82 according to their control by hand valves 83. The register conduit 59 delivers to registers 84 according to their control by hand valves 85. The atmospheric conduits 57 and 60, as shown in Fig. 4 deliver to or from the atmosphere outside the house $xyz$ by opening at their outside ends into the atmosphere, at locations somewhat remote from each other. This distance from each other should be considerable. The registers 82 which are exhausting registers all are adapted to exhaust air from rooms. The registers 84 are adapted to deliver air to the same rooms and should be stationed somewhat remotely from the other registers in the rooms wherein they are located. The thermostatic means 76 is only diagrammatically shown but may be any type of thermostatic control means such as is commonly known and is adapted to cause operation for either summer or winter according to which switch 79 or 80 is closed and in the summer position causes current delivery to motor 2 when the temperature in the rooms is over a predetermined high, and conversely causes delivery of current to motor 2 in winter when the temperature in the rooms is under a predetermined minimum for which the apparatus may be regulated.

It will be noted that the space 31ª designates the entire heat receiving space in heat transfer means 13 rightwardly of the wall 33 in means 13 and includes not only the heat receiving passages 31 which are located on the rightward side of wall 33 but also includes the annular space specially denoted M which connects with all of the heat receiving passages which are rightwardly of wall 33 and thereby connects this portion of the heat receiving passages with the conduit 34. Likewise the space 31ᵇ designates the entire heat receiving space in heat transfer means 13 leftwardly of the wall 33 in means 13 and includes not only the heat receiving passages 31 which are located on the leftward side of wall 33 but also includes the annular space specially denoted N (Figs. 1 and 2) which connects with all of the heat receiving passages which are leftwardly of wall 33 and thereby connects this portion of the heat receiving passages with the conduit 35. All the inner ends of the portion of heat receiving passages on one side of the wall 33 connect with the inner ends of the heat receiving passages on the other side of the wall 33 by way of the annular space 36 inwardly of the metal walls forming the compressed air flues 23, so that there is thus continuous passage of the air or fluid from the heat receiving passages on one side to the heat receiving passages on the other side of wall 33 to or from the associated annular spaces M and N. While Fig. 2 is a section on the line 2—2 through the heat receiving passages 31 and anular space N and space 36 on one side of wall 33, a section on the line 2ª—2ª Figure 1 on the other side of wall 33 through the heat receiving passages 31, annular space M and space 36 would be exactly similar to the section shown as Fig. 2, and therefore such section on line 2ª—2ª is not specifically illustrated.

It is contemplated that this device may be used in either the winter or the summer and especially in moderate climates such as the north and south temperate zones. For use in winter for heating a house space or any enclosed space such as a railroad coach car or freight car for perishables such as fruit and vegetables, the device is set by its controls for either one or the other operation, winter or summer. The switch 80 may be closed for winter operation or the switch 79 may be closed for summer operation, the other switch in either case being open. It is contemplated that any regulating or adjusting means for the thermostatic control may be provided as usual with such thermostatic control means. At the same time, when the operator sets the said switches, he will also set the valves 52 and 53 for either the summer or winter operation. In the Figure 3, the valves 52—53 are shown as set for the winter operation of the device, that is for the abstraction of heat from the atmospheric air inspirated and expelled continuously by the device for the heating of the house air or air used for the house heating. The setting of valves 52—53 in Fig. 3 is then the setting for winter operation and heating of the house interior. To secure the opposite, namely the cooling of the house air for summer operation and conditions, the operator after setting the switches 79 and 80, for such operation, then turns the crank handle 75 so as to turn spur gear 74 and thereby turns gears 71—73 simultaneously so as to turn valves 52—53 simultaneously. The operator continues to turn gear 74 until the valves 52 and 53 are simultaneously turned into their opposite operative positions, as hereafter set out, for summer operation. When the operator has located the valves for either position according to the season of the year, he may lock the gear 74 and with it gears 71—73 and valves 52—53 in either the winter or summer positions, by placing the pivoted latching means 86 in engagement with the spur gear 74, as shown in Fig. 1. Thus locked the valves remain in the predetermined position for the duration of the season and until the arrival of the next season.

The use and operation of the device for the winter operation, with the valves in the positions as shown in Figure 3 is now described. It should be noted that any means or marking on the side faces of gears 71—73 may be placed thereon to enable the operator to determine the location of the valves in either position. Assuming that current is supplied by main lines L, the thermostatic means 76 will then, whenever the temperature in the house interior is under the predetermined minimum which may be say 72 degrees or thereabouts, Fahrenheit, cause the relay means 81 to send operating current through the electric motor 2, and thereby the shaft 4 is rotated at a high rate of speed, which speed is preferably say seven or eight thousand, or as much as ten thousand revolutions per minute. The speed of operation will depend to some extent on the nature of the individual construction, its proportions, and material strength, the power of motor 2, but it is preferred that the speed be somewhere in the range between seven thousand and ten thousand revolutions per minute. The proportioning of the apparatus may be the governing factor in operation but it is contemplated that any governing device limiting the speed may be used with the device, as is commonly done with high speed apparatus.

Assuming now that the shaft 4 is rotating at the speed of ten thousand revolutions per minute, then the compressor rotor 5 with its blades 6 and the turbine rotor 7 with its blades 8 and the gear 17 will rotate at the same speed ten thousand revolutions per minute, and the drive will be transmitted through the reduction gearing 18, 20, 21, so as to drive the fan unit 14 and its blades 14ª at a speed which may be say one thousand to two thousand revolutions per minute, depending on the construction. Under this condition of operation there will be two main streams of air in movement through the apparatus, the one stream moved by compressor rotor 5 and its blades will be a rapidly moving stream and the other stream, that moved by the fan unit 14 will be a slowly moving stream.

The rapidly moving stream may have a speed of as much as one-thousand or more feet per second or more than that depending on the construction, and therefore a large volume of air, in proportion to the size of the apparatus will be moved through the compressor annular passage from the atmosphere by way of conduit 57 port 56 in valve 53 conduit 30 and pipe 29 to annular chamber 22, thence through the pasage occupied by blades 6—10, to be there compressed and passed through compressor air flues 23 and from the latter to the annular passage 25 wherein turbine blades 8 rotate with rotor 7, thereby to annular chamber 26 to pipe 27, thereby to conduit 28, through port 61 in valve 53, to pipe 60, and by the pipe 60 to the atmosphere outside the house.

The slowly moving stream will be moved by the fan blades 14ª from the air registers 82 in rooms xyz through conduit 55, thence to branch conduit 63, thence through port 62 in valve 52, thence to transverse conduit 49, to vertical pipe 47, thereby to space 41 in the fan casing 15, thereby as moved by the fan blades to space 42 to pipe 34 and thereby to annular space M to the heat receiving passages 31 rightwardly of wall 33 in heat transfer means 13, thereby to inner annular space 36, thereby to the inner ends of the heat receiving passages 31 leftwardly of wall 33 in means 13, through the heat receiving passages 31 leftwardly of wall 33 to annular space N, thereby to pipe 35, to transverse conduit 50, thereby through port 66 in valve 52, through branch pipe 67 to conduit 59 and thereby to the rooms xyz by way of the registers 84.

There is thus a continuous stream of rapidly moving air moved from the atmosphere through the compressor A to compressor air flues 23 and through turbine 11 back to the atmosphere. In this passage which involves a large quantity of air, proportionately, the atmospheric air is compressed by the compressor A to a pressure of approximately as much as sixty pounds or more per square inch, and in compression to this pressure or greater, the air will reach a temperature of at least as much as three hundred degrees Fahrenheit above zero Fahrenheit, even though the outside atmospheric air is around zero Fahrenheit or even below that temperature. In some constructions and climates the temperature may reach as much as four hundred degrees Fahrenheit above zero Fahrenheit.

The air compressed and heated as stated reaches the compressed air flues 23 at the temperature of three hundred degrees or over, and the pressure of approximately 60 pounds or more, and in passing through passages 23 gives up heat to walls 32 of these passages 23 and this is transmitted by walls 32 to the air passing more slowly through the passages 31, so that as the compressed air in flues 23 reaches the rightward end of these flues, Fig. 1, it will have a considerable proportion of the heat removed from it, although it will by virtue of the construction reach the rightward end of these flues 23, Fig. 1, without any appreciable or important drop in pressure, and will enter annular space 24 and pass by guides 12ª at the high pressure of near 60 pounds per square inch. As the compressed air enters turbine annular passage 25 it will in passing the rotor blades 8 and stator blades 12 expand and increase in velocity and will expend energy in driving the blades 8 and thereby rotor 7 and shaft 4, thereby returning some work energy to shaft 4 although not as much work as the work which is put into shaft 4 by motor 2. The expansion in passing through turbine 11 will cause a considerable drop in temperature of the air as it leaves the turbine and passes by way of the conduit 60 back to atmosphere, so that the air will reenter the outside atmosphere at a temperature considerably below the temperature at which it left the outside atmosphere and passed into the device. Thus heat has been abstracted from the outside air and passed into the slowly moving air stream in heat receiving passages 31. The heat received by the air in heat receiving passages 31 is carried with that stream of air through port 66 in valve 52 to pipe 59 to the air registers 84 and thereby to rooms $xyz$. The air in the rooms is continuously recirculated or may receive some addition of fresh outside air by way of fresh air pipe 87 if the hand valve 88 is left open or partially open. Preferably not much air is admitted by way of pipe 87, so that the air in the rooms may readily be heated when necessary. The hand valve 88 may be kept constantly closed and other means adopted for ventilation or the customary leakage will be sufficient, by way of windows and doors, and crevices.

The air passing in the slowly moving stream as driven by fan unit 14 will be at the pressure of the rooms, namely atmospheric pressure or very nearly so, and there will be no loss of heat in the apparatus at any point therein, as the air stream moves comparatively slowly and at the low atmospheric pressure. Accordingly a very large proportion of outside atmospheric air is moved at high speed through the compressed air space of the device to have its heat abstracted to heat a comparatively slow and small volume of the inside air moved through the device by way of heat receiving passages 31. Thus each volume of outside air need give only a comparatively small proportion of heat to heat a comparatively small volume of inside air as it moves through passages 31. When the temperature in rooms $xyz$ reaches the predetermined minimum 72 or more degrees the current passed by relay 81 to motor 2 will cease to operate the shaft 4 and the apparatus will come to rest. Loss of heat by circulation of air through the compressor and turbine passages will not be appreciable as the air in neither air stream will be moved forcibly, but in any construction any automatic means or manuable means such as valves 83—85 of the registers may be used to cut off any flow whatever, if that be found necessary.

It is to be noted that with increasing effectiveness of air compressors of the axial flow type, the air compression may be carried to as much as say 100 pounds p. s. i., as improved design of compressors makes such higher pressures available and thereby the temperature available in flues 23 may be considerably higher. To this end the air compression in the device may be performed by rotary type compressors such as Rootes type blowers or piston operated compressors, but the axial flow type is at present preferred as the most simple and efficient.

The use and operation of the device for the summer operation, with the valves in the positions alternative or opposite to that shown in Figure 3 is now described. The operator or user turns the handle crank 75 to turn spur gear 74 and gears 71—73 and valves 52—53, after lifting the locking means 86, until the marking means on the face of the gears indicates that the ports of the valves are in their exact opposite positions, that is the positions for the alternative or opposite connections of the conduits through the ports. In this opposite position, the port 54 is in communication with transverse conduit 30 while the port 56 is cut off from this communication; the port 58 is in communication with transverse conduit 28 and port 61 is not; the port 64 is in communication with transverse conduit 49 and port 62 is not; and port 68 is in communication with transverse conduit 50 and port 66 is not. Assuming that current is supplied to motor 2 by main lines L, thermostatic means 76 will then (the control switches being set for the summer control) whenever the temperature in the house interior is over the predetermined maximum which may be 72 or 75 degrees Fahrenheit or thereabouts, cause the relay means 81 to send operating current through motor 2, and thereby shaft 4 is rotated at a high rate of speed, such as for winter operation (although control means may be provided to vary this speed), and then the compressor 5 and turbine rotor 7 with their blades and the gear means will rotate at the high speed as, before described, and the fan unit 14 will similarly operate at a slower rate of speed, say two thousand revolutions per minute, and thus the one stream moved by compressor rotor 5 will be a rapidly moving stream and the other stream, that moved by fan unit 14 will be a slowly moving stream.

The rapidly moving stream will be moved by the compressor rotor 5 through the compressor annular passage from the registers (or elements as in Fig. 4) by way of conduit 55, port 54, conduit 30, annular chamber 22, thence through the compressor annular passage, through compressed air flues 23, to annular passage 25, to annular chamber 26, to pipe 27, to conduit 28, through port 58 in valve 52, to pipe 59, and thereby to the registers in rooms $xyz$ (or elements in said rooms $xyz$ as in Fig. 4).

The slowly moving stream will be moved by fan unit 14 from the atmosphere through pipe 57 from atmosphere to branch pipe 65, through port 64 in valve 53, conduit 49, pipe 47 and spaces 41—42, pipe 34, annular space M, heat receiving passages 31, rightwardly of wall 33, annular space 36, heat receiving passages 31 leftwardly of wall 33 Fig. 1, annular space N, pipe 35, conduit 50, port 68 in valve 53, branch pipe 69 and by way of conduit 60 to atmosphere outside the house walls.

The rapidly moving stream passing through the compressor annular passage of compressor A will be highly compressed, to the pressure of say 60 pounds p. s. i., or more, and therefore will attain a much higher temperature, than the temperature at which it enters compressor A, and as such heated compressed air will pass through compressed air flues 23, and in passage through flues 23 much heat will be abstracted from the compressed air by the air stream moving through the heat receiving passages 31. The pressure of the compressed air stream will not appreciably or substantially drop in passing through flues 23, but the compressed air stream will reach annular space 24 and turbine annular space 25 at relatively high pressure, and the expansion of this high pressure air stream will occur in the passage through the turbine annular passage 25 wherein are the turbine blades 8 and 12, and by this expansion in passage 25 working effort will be expended upon the turbine rotor blades 8 thereby giving rotational driving impulse to the turbine rotor 7 and returning some of the working effort expended upon shaft 4 by motor 2, to shaft 4 and thereby to compressor rotor 5. The compressed air stream moved by rotor 5, will after expansion in turbine annular passage 25, have had considerable of its heat abstracted from it in the compressed air flues 23, and therefore as this air expands in passage 25 of the turbine B the temperature of the air will be lowered below the temperature at which it entered the compressor A from the pipe 55 and registers (or elements of rooms xyz) and at such lowered temperature will be restored to the registers and rooms (or the elements in rooms xyz) to effect cooling in rooms xyz. The air will in rooms xyz absorb some more heat, and with this added absorption will again return to compressor A by the route described. In this continuous circuit, heat will be continuously abstracted by the air moved from atmosphere by way of pipe 57, casing 15 and the heat receiving passages 31, and this flow of air from atmosphere will continuously be effective to cool the air from pipe 55 and rooms xyz by abstraction of heat from this air as compressed by rotor 5 in compressor A. Whenever the temperature has thereby been lowered in rooms xyz to a temperature under the predetermined maximum 72 or thereabouts, then the thermostatic regulator means will cut off the current flow to motor 2 and the apparatus will cease to function until decrease of temperature in rooms xyz is again required.

Referring now to the Figs. 5 and 6 which show the modified form of my device, this form is contemplated to be a more compact inclusion of the general devices of my device, so that it may in this form be more adaptable to use in some conditions or locations, such as for instance in single rooms or in houses where one single unit serving the house may be used, or in houses or buildings where several of such units may be used at different locations in the building. This form needs no conduits or devices separate from the main device, so that it is thus more readily installed, and in some cases more cheaply installed.

In this form the principal operating devices namely the compressor A, and the turbine B, and the heat transfer unit 13, and the motor 2, are substantially the same as in the first form described and the parts of these main units are designated with the same numerals as in the first form described, and they perform similarly, so they are not again specifically designated, as to their construction. This form differs from the first form, chiefly in the form of the control valve means and its placing relatively to the main operating units, A, B, 13. The shaft 4 of this form is placed vertically as shown in Fig. 5, and the entire unit is mounted and secured by means of a lower base 89 and a so-called wall-base 90 which are cast integrally with the main units or elements thereof, so that the parts of the device are rigidly mounted in the position shown. The compressor and turbine casings 9 and 11 and the heat transfer unit 13 may be in construction split either on a plane passing axially through shaft 4 or it may be constructed in parts divided transversely of shaft 4. This is a matter of construction and the drawings do not specifically show this, as they are drawn in a manner to best show the operation of the device.

The wall-base 90 on its back side is flat vertically so that it may be placed firmly and closely against the interior face of a building wall W, the lower base 89 being placed flatly upon the upper face of a floor F of the building, where it may be installed. The wall-base 90 has a conduit 91 formed in it which serves to connect to air chamber 22, the intake chamber of the compressor A, by means of passage 95 formed in wall W. The wall-base 90 has a conduit 92 formed in it which serves to connect annular chamber 26, the exhaust chamber of the turbine B, with outside air, by means of passage 96 formed in wall W. The wall-base 90 has a conduit 93 formed in it which serves to connect the space M and heat receiving passages 31 on one side of wall 33 with the outside air by means of passage 97 formed in the wall W. The wall-base 90 has also a conduit 94 formed in it which serves to connect the space N and thereby the heat receiving passages 31 on the other side of wall 33 in unit 13 with outside air by means of the passage 98 formed in wall W. The conduits 91, 92, 93 and 94, are not open however except as controlled by the valve means hereafter described. The passages 95, 96, 97 and 98 may deliver directly into the outside atmosphere or receive air therefrom directly, in event the normal movement of outside air by wind externally of the house, would be depended upon to move air across the open ends of the passages, so that one current would not be, except in a miner degree mixed with another. But these passages in wall W may have on their external ends, metal or other shielding units, 99, 100, 101 and 102, secured to the exterior face of wall W as in Fig. 5, and Fig. 6, to direct currents away from each other, so that there would be less danger of intermixing of the currents.

The conduits 91, 92, 93, 94 are controlled by means of a flat valve 103 which is slidable vertically in a shallow space formed in base 90, this space being denoted 104. The valve 103 is wide as shown in Fig. 6 and long as shown in Fig. 5, and has the ports 105, 106, 107, and 108, which serve individually to open or close the conduits 91, 92, 93, 94, the ports in the valve being so located, that the alternative opening of the conduits, as hereafter described, is facilitated.

The front side of the structure, that exposed to and facing the interior of the enclosed space, wherein the device is located, has a valve structure or casing 109 formed with the device or united with it, and this so-called valve structure 109 has formed in it, the conduits 110, 111, 112, 113, which respectively serve to connect the annular chamber 22, the annular chamber 26, the annular chamber or space M and heat passages 31 on one side of wall 33, the annular chamber or space N and heat passages 31 on the other side of wall 33, with the inside air of the enclosed space wherein the device is located, this inside air being the air located directly in front of the structure. These connections are not made however except when the ports 114, 115, 116, 117, respectively, in the flat valve 118, are respectively, in positions to permit the connection, and such connections are made only in the alternative manner, as hereafter described. The flat valve 118 is placed to slide vertically in the shallow space 119 formed in the valve structure 109, and at its upper end has an arm 120 which has a somewhat flexible connection 121 with the near end of a walking beam 122. This walking beam 122 is pivotably mounted at 123 on brackets 124 (one being shown), on the upper end of the structure of the device, and at its opposite end has the flexible connection 125 by which it is connected with the arm 126 of the valve 103, so that as one valve 103 is lifted, the other valve 118 is lowered to procure the alternative locations of the ports as hereafter set out. A handle 127 provides for manual change of these positions to one or the other and the set screw 128 provides for securing the axle 129 of the walking beam and thereby the valves in either of the alternative positions. It should be noted that the flexible connections at either end of walking beam 122, namely connections 121, 125, should permit such horizontal movement, very slightly, as will permit the movements of the valves without cramping or obstruction, or any linkage may be provided to obviate such restriction of the movement.

The valves described, generally operate to connect the conduits to achieve the alternative connections of the main units, a compressor A, turbine B, and heat transfer unit 13, in manner similar to such alternative connections in the first form described. This connection is specifically as follows: For the winter operation, to provide the heat abstraction, the valves 103 and 118, are located as shown in Figures 5 and 6, and in this location of the valves, the operation is as follows. The compressor rotor 5 by its blades 6 draws atmospheric air from outside the building, through passage 95, conduit 91, port 105, to chamber 22, thereby to intake end of the compressor space where this air is compressed as in the first form to say sixty pounds or more pressure per square inch, the compressed air flows as compressed and heated air through compressed air flues 23 where there is substantially none or very little pressure drop, as in the first form described, the compressed air after giving up the heat generated by compression to the fluid in heat receiving passages 31 by means of walls 32, passes to annular space 24 and thereby to the intake of the turbine space 25, the compressed air expands in space 25 and expends working effort on blades 8 of the turbine rotor 7 and after such expansion passes to annular chamber 26 and thereby to conduit 92, through port 106 of valve 103, through passage 96 to atmosphere where the air is directed away from the entering air by the shield 102.

The rotation of the shaft 4, by means of motor 2, and the contributing work imparted to shaft 4 by means of blades 8, also rotates the small centrifugal compression or blower rotor 130 which is keyed to shaft 4 to rotate therewith, and this rotation of blower rotor 130 causes air to be drawn from the inside air of the enclosed space wherein the device is installed, through conduit 112, port 116, annular space M, thereby through heat receiving passages 31 on the lower side of wall 33 to internal annular space 36, thereby through the vanes of blower rotor 130 to the inner ends of the heat receiving passages 31 on the upper side of wall 33, and thereby, after receiving heat by transfer through walls 32, the air is passed by way of annular space N through conduit 113 and port 117 in valve 118 back to the air inside the space of the enclosed space wherein the device is located. Thus the inside air, by repeated passing of the inside air through heat receiving passages 31 is heated by the heated air of compression in flues 23 where the compressed outside air passes.

To achieve the summer cooling, when the season change occurs, the attendant, by means of handle 127 raises valve 118 and lowers valve 103, after releasing the set screw 128 and resets the valves so that the valve ports are in the alternative positions, wherein ports 105 and 106 are moved to be closed by the wall of wall base 90 so there is no passage therethrough or through conduits controlled thereby, and whereby ports 107 and 108 are moved to be open to conduits 93 and 94 respectively so air may flow from atmosphere through passage 97 to space M heat receiving passages 31 below wall 33 space N port 108 and conduit 94 to passage 98 and thereby to atmosphere; and whereby ports 116 and 117 of valve 118 are moved away so that conduits 112 and 113 are closed and so that ports 114 and 115 are moved into communication with conduits 110 and 111 so that air from inside the enclosed space will flow to chamber 22, through the compression space of compressor A and as compressed and heated to flues 23 and thereby, after giving up heat to annular space 25 of turbine B, thereby after expansion and release of work energy to turbine blades 8 and rotor 7 to chamber 26 and thereby through port 115 and conduit 111 to the air of the inside space to be cooled. Repeated passage of the inside air through the compressor and turbine results in continual transfer of the heat of the compressed air in flues 23 to air from outside atmosphere as passed through heat receiving passages 31 by means of blower rotor 130, and thus the outside air as passed through passages 31 abstracts heat from the inside air which is now as compressed in flues 23 to there give up heat. Expansion of the inside air in the turbine space 25 now results in lowering of the temperature of the inside air as it is passed after expansion to the inside space of the enclosed space wherein the device is located.

The thermostatic control means is not specifically shown in connection but it is contemplated that this modified form as illustrated in Figures 5 and 6 will have in connection the thermostatic control means and relay and electric supply lines as in the first form shown and that thus this form is subject to control in the same manner as the first form is subject to control according to the temperature in winter or in summer and that the device will then be placed in operation by this control means as may be necessary to maintain the predetermined temperature.

I have shown the power unit 2 as an electric motor, but it is contemplated that this unit 2 may be any type of power unit such as a Diesel or gasoline engine or a hydraulic power means or wind power means and that whatever form of power means is used any type of thermostatic or other control may be used in connection to secure operation of the motor means and the shaft 4 in the manner as described, when such control or operation is required.

I particularly contemplate that my device may be used in dwellings or buildings, but I also contemplate that it may be used in any other types of buildings or in motorized transport means where such a means with freedom from fumes or odors to contaminate the air would be most convenient while providing the heating or cooling of the enclosed space air in a simple manner by efficient means.

While I have shown particular devices and combinations of devices in the illustration of my invention, I contemplate that other detailed devices and combinations of devices may be used in the realization of my invention, without departing from the principles and scope thereof as set out herein.

The turbine B of either form with its stator blades and rotor blades may generally, as in the claims hereafter stated, be called a fluid expansion motor means. This fluid expansion motor means receives the compressed air by way of a restricted opening thereto which is constituted by the annular passage 24, the stator guides 12ᵃ and the entrance to annular passage 25 of the turbine, which entrance may be of a sufficiently narrow cross section to restrict flow to that quantity, proportionately, which will not permit drop in presure in compressed air flues 23 beyond that necessary to permit steady flow without substantial pressure drop. The stator guides 12ᵃ may in some constructions permit some pressure drop to increase air velocity therein as the air flows to blades 8ᵃ, but in such case the annular chamber 24 or entrance to guides 12ᵃ should be of such small cross section as not to appreciably affect pressure in flues 23.

What I claim is:

1. In a means for changing the temperature of interior building or other enclosed space, a rotor shaft means, a compressor casing and an air compressing means mounted therein on said shaft means, the compressor casing having an air intake and an air discharge, a turbine rotor mounted on said shaft means and having a turbine casing about the rotor and an air induction at one end and an air discharge at the other end, compressed air channels intermediately of said compressor casing and said turbine casing and spaced circumferentially about the axis of said turbine rotor and conducting compressed air from said air discharge of said compressor casing through said air induction and said turbine casing and said air discharge of said turbine casing, heat receiving channels spaced circumferentially about the axis of said turbine rotor and intermediately of said compressed air channels and heat conductive walls between said last named channels and said first named channels, means for inducing flow of fluid for heat absorption through said heat receiving channels.

2. In a means for changing the temperature of a building interior or other enclosed space, a rotor driving means and a primary motive means engaged therewith to drive it, a compressor casing and a turbine casing, a compressing rotor mounted on said driving means and an air compressing channel between said compressing rotor and said compressor casing, a turbine rotor mounted on said driving means and a turbine fluid course between said turbine rotor and said turbine casing, compressed air channels spaced circumferentially about the axis of said turbine rotor and conducting compressed air from said compressing channel to said turbine fluid course, heat receiving channels spaced circumferentially about the axis of said turbine rotor and intermediately of said compressed air channels and heat conductive walls between said heat receiving channels and said compressed air channels, a primary air induction conduit and a primary air discharge conduit, a secondary air induction conduit and a secondary air discharge conduit, one of said induction conduits conducting air from outside atmosphere and the other of said induction conduits conducting air from the interior of said building or enclosed space, one of said discharge conduits conducting air to outside atmosphere and the other of said discharge conduits conducting air to the interior of said building or enclosed space, one of said induction conduits delivering to said compressing channel and the other of said induction conduits delivering to said heat receiving channels, one of said discharge conduits delivering from said turbine fluid course and the other of said discharge conduits delivering from said heat receiving channels, means inducing flow through said heat receiving channels.

3. All of the means as specified in claim 2 and in combination therewith, means for alternating the connections of said induction conduits with said compressing channels and heat receiving channels and for concurrently alternating the connections of said discharge conduits with said turbine fluid course and said heat receiving channels.

4. In a means for changing the temperature of a building interior or other enclosed space, a rotor driving means and a primary motor means engaged therewith to drive it, a compressor casing and a turbine casing, a compressing rotor mounted on said driving means in said compressor casing and an air compressing channel between said compressing rotor and said compressor casing, a turbine rotor mounted on said driving means in said turbine casing and a turbine fluid course between said turbine rotor and said turbine casing, compressed air channels spaced circumferentially about the axis of said turbine rotor and conducting compressed air from said compressing channel to said turbine fluid course and arranged individually at radial locations around the axis of said driving means, heat receiving channels spaced circumferentially about the axis of said turbine rotor and intermediately of said compressed air channels and heat conductive walls between said heat receiving channels and said compressed air channels, a primary air induction conduit and a primary air discharge conduit, a secondary air induction conduit and a secondary air discharge conduit, one of said induction conduits conducting air from outside atmosphere and the other of said induction conduits conducting air from the interior of said building or other enclosed space, one of said discharge conduits conducting air to outside atmosphere and the other of said discharge conduits conducting air to the interior of said building or other enclosed space, one of said induction conduits delivering to said compressing channel and the other of said induction conduits delivering to said heat receiving channels, one of said discharge conduits delivering from said turbine fluid course and the other of said discharge conduits delivering from said heat receiving channels, and means inducing flow through said heat receiving channels.

5. In a means for changing the temperature of a building interior or other enclosed space, a primary means including compressing means having a compressing space and in conductive sequence with said compressing space, a compressed air course within heat conductive walls, a secondary means comprising a heat transfer course adjacent said heat conductive walls of the compressed air course of said primary means, conductive means including atmospheric air inspirating means and atmospheric air aspirating means, another conductive means including a heating circuit having intake means in said enclosed space and having discharge means in said enclosed space, coordinated actuable means for alternatively including one of said conductive means with said primary means and the other of said conductive means with said secondary means, thermostatic control means susceptible to temperature change in said enclosed space and motor means for driving said primary means under the control of said thermostatic control means to effect driving of said primary means in one of said alternative conditions when temperature in said enclosed space is over a predetermined control temperature and to effect driving of said primary means in the other of said alternative conditions when temperature in said enclosed space is under a predetermined control temperature.

6. In a means for changing the temperature of interior building or other enclosed space, a pair of air conducting courses, one of said courses having connection with outside atmospheric air for inducting atmospheric air and having another connection with the outside atmospheric air for exhausting to the atmosphere the said air inducted, the other of said courses having connection with the inside air for inducting said inside air and having connection to said inside air for delivering thereto said inducted inside air, compressing means for inducting and compressing to a relatively high pressure a relatively large volume of air per unit of time and a compressed air course within heat conductive walls and a fluid expansion motor means in conductive sequence, a heat transfer conduit means adjacent said heat conductive walls of said compressed air course for reception of heat from compressed air in said compressed air course and air moving means for moving at atmospheric or relatively low pressure a relatively smaller volume of air per unit of time, a primary motor means, and means whereby said primary motor means and said fluid expansion motor means may each impart driving energy to said compressing means; an actuably coordinated valve means arranged in the connections of said pair of air courses, to procure according to its setting alternative conditions; one of which includes in said first named air course the said compressing means, compressed air course and fluid expansion motor means and includes in said second named air course the said heat transfer conduit means and air moving means; the other of which includes in said second named air course the said compressing means, compressed air course and fluid expansion motor means and includes in said first named air course the said heat transfer conduit means and air moving means.

7. In a means for changing the temperature of interior building or other enclosed space, a pair of air conducting courses, one of said courses having connection with outside atmospheric air for inducting atmospheric air and having another connection with the outside air for exhausting to the atmosphere the said air inducted, the other of said courses having connection with the inside air for inducting said inside air and having connection to said inside air for delivering thereto said inducted inside air, one of said courses including compressing means for inducting and compressing to a relatively high pressure a relatively large volume of air per unit of time and including a compressed air course within heat conductive walls and a fluid expansion motor means in conductive sequence, the other of said courses including a heat transfer conduit means adjacent said heat conductive walls of said compressed air course for reception of heat from the compressed air in said compressed air course and including air moving means for moving at atmospheric or relatively low pressure a relatively smaller volume of air per unit of time, a primary motor means, and means whereby said primary motor means and said fluid expansion motor means each may impart driving energy to said compressing means, a valve means arranged in the connections of said pair of air courses to procure according to its setting alternative conditions; one of which includes in said first named air course the said compressing means compressed air course and fluid expansion motor means and includes in said second named air course the said heat transfer conduit means and air moving means, the other of which includes in said second named air course the said compressing means compressed air course and fluid expansion motor means and includes in said first named air course the said heat transfer conduit means and air moving means; the said valve means comprising a pair of valves mounted in a pair of valve chambers each to be rotatable therein and formed to procure said conditions in alternative positions, a large gear for each valve fixed thereto, and a common small gear mounted between said large gears to be permanently in gear with each of said large gears, and means for turning said small gear to procure through said large gears the placing of said valve means for either of said alternative conditions.

8. In a means for changing the temperature of interior building or other enclosed space, a pair of air conducting courses, one of said courses having connection with outside atmospheric air for inducting atmospheric air and having another connection with the outside air for exhausting to the atmosphere the said air inducted, the other of said courses having connection with the inside air for inducting said inside air and having connection to said inside air for delivering thereto said inducted inside air, one of said courses including compressing means for inducting and compressing to a relatively high pressure a relatively large volume of air per unit of time and including a compressed air course within heat conductive walls and a fluid expansion motor means in conductive sequence, the other of said courses including a heat transfer conduit means adjacent said heat conductive walls of said compressed air course for reception of heat from the compressed air in said compressed air course and including air moving means for moving at atmospheric or relatively low pressure a relatively smaller volume of air per unit of time, a primary motor means, and means whereby said primary motor means and said fluid expansion motor means each may impart driving energy to said compressing means, a valve means arranged in the connections of said pair of air courses to procure according to its setting alternative conditions: one of which includes in said first named air course the said compressing means compressed air course and fluid expansion motor means and includes in said second named air course the said heat transfer conduit means and air moving means, the other of which includes in said second named air course the said compressing means compressed air course and fluid expansion motor means and includes in said first named air course the said heat transfer conduit means and air moving means; the said valve means comprising a pair of valves mounted in a pair of valve chambers each to be slidable longitudinally therein and formed to procure said conditions in alternative positions, a walking beam fulcrumed on a fulcrum and having flexible connection on one side of the fulcrum to one of said valves and having flexible connection on the other side of said fulcrum to the other of said valves, the said walking beam being oscillable to procure said alternative positions of said valves.

9. In a means for changing the temperature of interior building or other enclosed space, a pair of air conducting courses, one of said courses having connection with outside atmospheric air for inducting atmospheric air and having another connection with the outside air for exhausting to the atmosphere the said air inducted, the other of said courses having connection with the inside air for inducting said inside air and having connection with said inside air for delivering thereto said inducted inside air, compressing means for inducting and compressing to a relatively high pressure a relatively large volume of air per unit of time and a compressed air course within heat conductive walls and a fluid expansion motor means in conductive sequence, a heat transfer conduit means adjacent said heat conductive walls of said compressed air course for reception of heat from the compressed air in said compressed air course and air moving means for moving at atmospheric or relatively low pressure a relatively smaller volume of air per unit of time, a primary motor means, means whereby said primary motor means and said fluid expansion motor means may each impart driving energy to said compressing means; a valve means arranged in the connections of said pair of air courses, to procure according to its setting alternative conditions: one of which includes in said first named air course the said compressing means compressed air course and fluid expansion motor means and includes in said second named air course the said heat transfer conduit means and air moving means; the other of which includes in said second named air course the said compressing means compressed air course and fluid expansion motor means and includes in said first named air course the said heat transfer conduit means and air moving means; the said valve means including a pair of valves and a coordinating means by which said valves are actuated in coordinated manner to procure said alternative conditions in alternative positions of said valves.

10. In a means for changing the temperature of interior building or other enclosed space, a rotor driving means and a primary motor means engaged therewith to drive it, a compressor casing and a turbine casing, a compressing rotor mounted on said driving means in said compressor casing and an air compressing channel between said compressing rotor and said compressor casing, a turbine rotor mounted on said driving means in said turbine casing and a turbine fluid course between said turbine rotor and said turbine casing, compressed air channels conducting compressed air from said compressing channel to said turbine fluid course and arranged individually at radial locations around the axis of said driving means, heat receiving channels intermediately of said compressed air channels and heat conductive walls between said heat receiving channels and said compressed air channels, a primary air induction conduit and a primary air discharge conduit, a secondary air induction conduit and a secondary air discharge conduit, one of said induction conduits conducting air from outside atmosphere and the other of said induction conduits conducting air from the interior of said building or other enclosed space, one of said discharge conduits conducting air to outside atmosphere and the other of said discharge conduits conducting air to the interior of said building or other enclosed space, one of said induction conduits delivering to said compressing channel and the other of said induction conduits delivering to said heat receiving channels, one of said discharge conduits delivering from said turbine fluid course and the other of said discharge conduits delivering from said heat receiving channels, and an air blower means mounted on said rotor driving means to be driven thereby and located centrally of said compressed air channels to induce flow through said heat receiving channels.

11. In a means for changing the temperature of a building interior or other enclosed space, a rotor driving means and a primary motor means engaged therewith to drive it, a compressor casing and a turbine casing, a compressing rotor mounted on said driving means in said compressor casing and an air compressing channel between said compressing rotor and said compressor casing, a turbine rotor mounted on said driving means in said turbine casing and a turbine fluid course between said turbine rotor and said turbine casing, compressed air channels conducting compressed air from said compressing channel to said turbine fluid course and arranged individually at radial locations circumferentially of the axis of said rotor driving means and turbine rotor, heat receiving channels circumferentially of said axis and intermediately of said compressed air channels and heat conductive walls between said heat receiving channels and said compressed air channels said heat receiving channels arranged in two planes transversely of said axis, the heat receiving channels in one plane separated from those in the other plane by dividing means, an annular chamber circumferentially of said axis and radially interiorly of said heat receiving channels and open to the inner ends of all of said heat receiving channels, a primary air induction means and a primary air discharge means, a secondary air induction means and a secondary air discharge means, one of said air induction means conducting air from outside atmosphere and the other of said air induction means conducting air from the interior of said building or other enclosed space, one of said discharge means conducting air to outside atmosphere and the other of said discharge means conducting air to the interior of said building or other enclosed space, one of said air induction means delivering to said compressing channel and the other of said air induction means delivering to said heat receiving channels in one of said planes, one of said discharge means delivering from said turbine fluid course and the other of said discharge means delivering from the heat receiving channels in the other of said planes, and an air blower means mounted on the said rotor driving means and in said annular chamber to be driven by said rotor driving means to induce flow through said heat receiving channels and from the said heat receiving channels in one of said planes to the said heat receiving channels in the other of said planes.

12. In a means for change of temperature in a building or other interior enclosed space, an air compressing means having a compressing space, compressed air channels within heat conductive walls the said compressed air channels spaced circumferentially of an axis, heat receiving channels spaced intermediately of said compressed air channels and between said heat conductive walls, an annular chamber about said axis and radially inwardly of said compressed air channels and open to said heat receiving channels inwardly thereof, a division between said heat receiving channels to divide said heat receiving channels into two sections, a turbine rotor within a turbine casing and mounted to rotate on said axis, a fluid expansion space between said turbine rotor and said turbine casing, the said compressing means, compressed air channels and fluid expansion space being in conductive sequence, an outside atmospheric air inspirating means for passing outside air to said compressing space of said compressing means, a discharge to atmosphere for discharge from said fluid expansion space to outside atmosphere, a primary power unit delivering driving power and means coupling said primary power unit and said turbine rotor to said compressing means for driving it, and a conduit means for passing an interior space heating fluid to one of said two sections of said heat receiving channels and thereby to said annular chamber and thereby to the other section of said heat receiving channels and thereby continuing in said circuit, and a heating fluid displacer mounted to revolve in said annular chamber on said axis and to be driven by said primary power unit and said turbine rotor.

13. All of the means as stated and claimed in claim 9 and the said pair of valves mounted in a valve structure at the side of said compressing means and fluid expansion motor means each of the said valves having rotation or oscillation in the said valve structure to procure the said alternative conditions, the said coordinating means including gearing by which the said valves are given movement to procure the said alternative conditions and coordinated in that movement.

14. All of the means as stated and claimed in claim 9 and the said pair of valves mounted in a pair of valve structures at sides of the said compressing means and fluid expansion motor means each of the said valves having slidable movement in the said valve structures, the said coordinating means including means to move said valves into either of alternative positions to procure the said alternative conditions by concurrent actuation of said valves.

ADOLPHE C. PETERSON.

REFERENCES CITED

The following references are of record in the file of this patent:

UNITED STATES PATENTS

| Number | Name | Date |
|---|---|---|
| 1,788,673 | Houston | Jan. 13, 1931 |
| 1,965,733 | Chamberlain | July 10, 1934 |
| 2,143,895 | Musham | Jan. 17, 1939 |